US005893482A

United States Patent [19]

Lang

[11] Patent Number: 5,893,482

[45] Date of Patent: Apr. 13, 1999

[54] PRODUCT-DISPENSING DEVICE OF A VENDING MACHINE

[75] Inventor: Dieter Lang, Dinkelsbühl, Germany

[73] Assignee: Sielaff GmbH & Co. Automatenbau Herrieden, Herrieden, Germany

[21] Appl. No.: 08/794,305

[22] Filed: Feb. 3, 1997

[30] Foreign Application Priority Data

Feb. 19, 1996 [DE] Germany .......................... 196 06 056

[51] Int. Cl.[6] .................................................... B65G 59/00

[52] U.S. Cl. ............................ 221/67; 221/116; 221/301

[58] Field of Search .............................. 221/67, 95, 116, 221/301

[56] References Cited

U.S. PATENT DOCUMENTS

| | | | |
|---|---|---|---|
| 4,019,650 | 4/1977 | Oden | 221/67 |
| 4,036,400 | 7/1977 | Oden | 221/67 |
| 4,460,107 | 7/1984 | Lindsey | 221/67 |

FOREIGN PATENT DOCUMENTS

| | | | |
|---|---|---|---|
| 662078 | 4/1965 | Belgium | 221/67 |
| 1 177 859 | 9/1964 | Germany . | |
| 2 317 608 | 10/1974 | Germany . | |
| 29 16 694 C2 | 3/1983 | Germany . | |
| 36 08 942 A1 | 9/1987 | Germany . | |
| 35 34 498 C2 | 9/1988 | Germany . | |

*Primary Examiner*—H. Grant Skaggs
*Attorney, Agent, or Firm*—McGlew and Tuttle

[57] ABSTRACT

A rocker, which is pivotable for dispensing products and has a lower product support part, is arranged at the bottom of a product shaft in a product-dispensing device of a vending machine. To achieve trouble-free dispensing even in the case of bottles or cans made of a soft material, an upper product support part is formed by an attachment mounted tiltably on the rocker. A stop device, by which the rocker pivots the attachment with it, is provided between the rocker and the attachment. A free-running angle is provided between the rocker and the attachment.

20 Claims, 2 Drawing Sheets

1
2
3
4
5
6
7
8
10
11
12
13
K
A
F
S
2.1
2.2
2.3

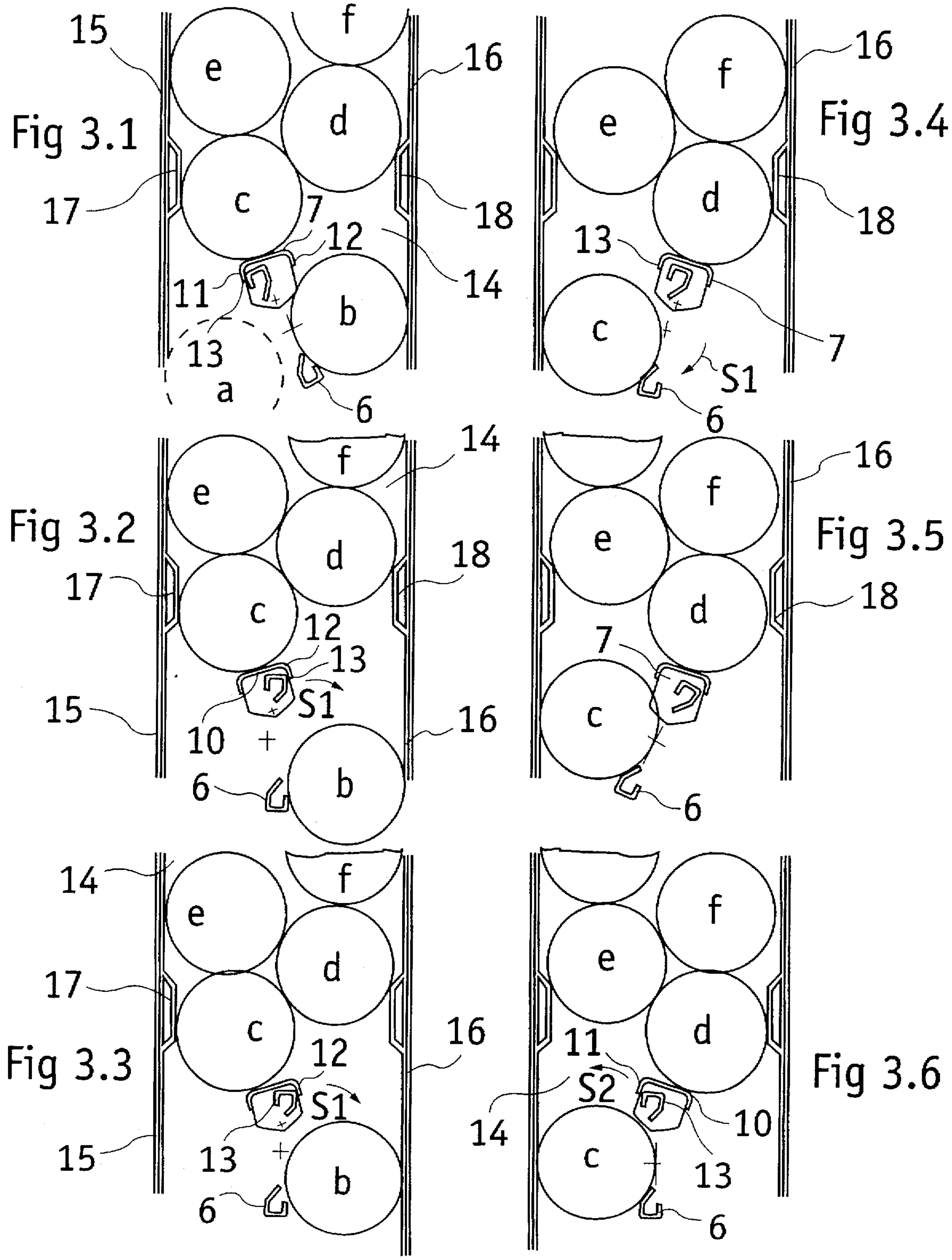
Fig 3.1
15
16
e
f
d
17
c
7
12
18
11
14
b
13
a
6
Fig 3.2
14
f
e
d
17
18
c
12
13
S1
15
10
16
6
b
Fig 3.3
14
f
e
d
17
c
12
16
S1
15
13
6
b
Fig 3.4
16
f
e
d
18
13
c
7
S1
6
Fig 3.5
16
f
e
d
18
7
c
6
Fig 3.6
f
e
d
11
S2
14
10
c
13
6

PRODUCT-DISPENSING DEVICE OF A VENDING MACHINE

FIELD OF THE INVENTION

The present invention pertains to a product-dispensing device of a vending machine, especially for bottles or cans, with a rocker, which is arranged at the bottom of a product shaft and can be alternatingly pivoted into a right and left starting position for dispensing products and has an upper product support part and a lower product support part, which parts perform pivoting movements in opposite directions to the right and left while the rocker is being driven.

BACKGROUND OF THE INVENTION

Such a product-dispensing device is described in DE 29 16 694 C2. In the course of the pivoting of the rocker, the products first arrive on the upper product support part and then at the lower product support part, from which they drop out. The upper product support part as well as the lower product support part are fixed to the rocker in DE 29 16 694 C2. The bottle in question lies directly at the edge of the support surface of the upper product support part in the starting positions. This is unproblematic in the case of hard bottles or cans of a round cross section. However, jamming, which may cause damage to the bottle, may occur during dispensing in the case of bottles known to exist on the market, which are made of a soft material and/or have a nonideal round or rounded square cross section.

Another product-dispensing device at the bottom of a vertical product shaft is described in DE 36 08 942 A1.

SUMMARY AND OBJECTS OF THE INVENTION

The primary object of the present invention is to propose a product-dispensing device of the type described in the introduction, which also makes it possible to dispense bottles or cans made of a soft material, without such bottles or cans jamming during dispensing and/or being damaged.

This object is accomplished according to the present invention by the upper product support part being formed by an attachment tiltably mounted on the rocker and by a stop means, by means of which the rocker also pivots the attachment, being provided between the rocker and the attachment, wherein there is a free-running angle between the rocker and the attachment.

It is achieved as a result that the bottle or can finds a more or less flat support on the support surface of the attachment; at any rate, it does not rest at the edge of the attachment only. It is achieved due to the free-running angle that the lower product support part of the rocker can still be moved farther without movement of the rocker in order to guarantee that the product will drop out with certainty.

The need to make the support surface of the upper product support part especially wide, which would be unfavorable for the overall design of the product-dispensing device, is avoided by the device described.

The product-dispensing device is especially suitable for commercially available water bottles made of soft PET, which inherently do not have an ideal, round or rounded square cross section or are deformed under the load of the stack of products. The product-dispensing device may, of course, also be used to dispense other bottles or cans.

The rocker preferably pivots with the attachment from the starting positions after passing through the free-running angle (F). The attachment preferably stops under the load of the stack of products before the rocker reaches its starting position. The attachment is preferably mounted on the rocker above the pivot axis (A) of the said rocker (e.g. at a location between the pivot axis (A) and an upper end of the rocker). The longitudinal edges of the attachment are preferably bent over, and a part rigidly attached to the rocker engages between them. Above the attachment, the product shaft preferably has baffles, which narrow the product shaft.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIGS. 3.1 through 3.6 show sectional views of the rocker in the product shaft during the dispensing of products, wherein the bottles are shown as having ideally round cross sections for simplification of the representation.

DESCRIPTION OF THE PREFERRED EMBODIMENT

Figures 1, 2:
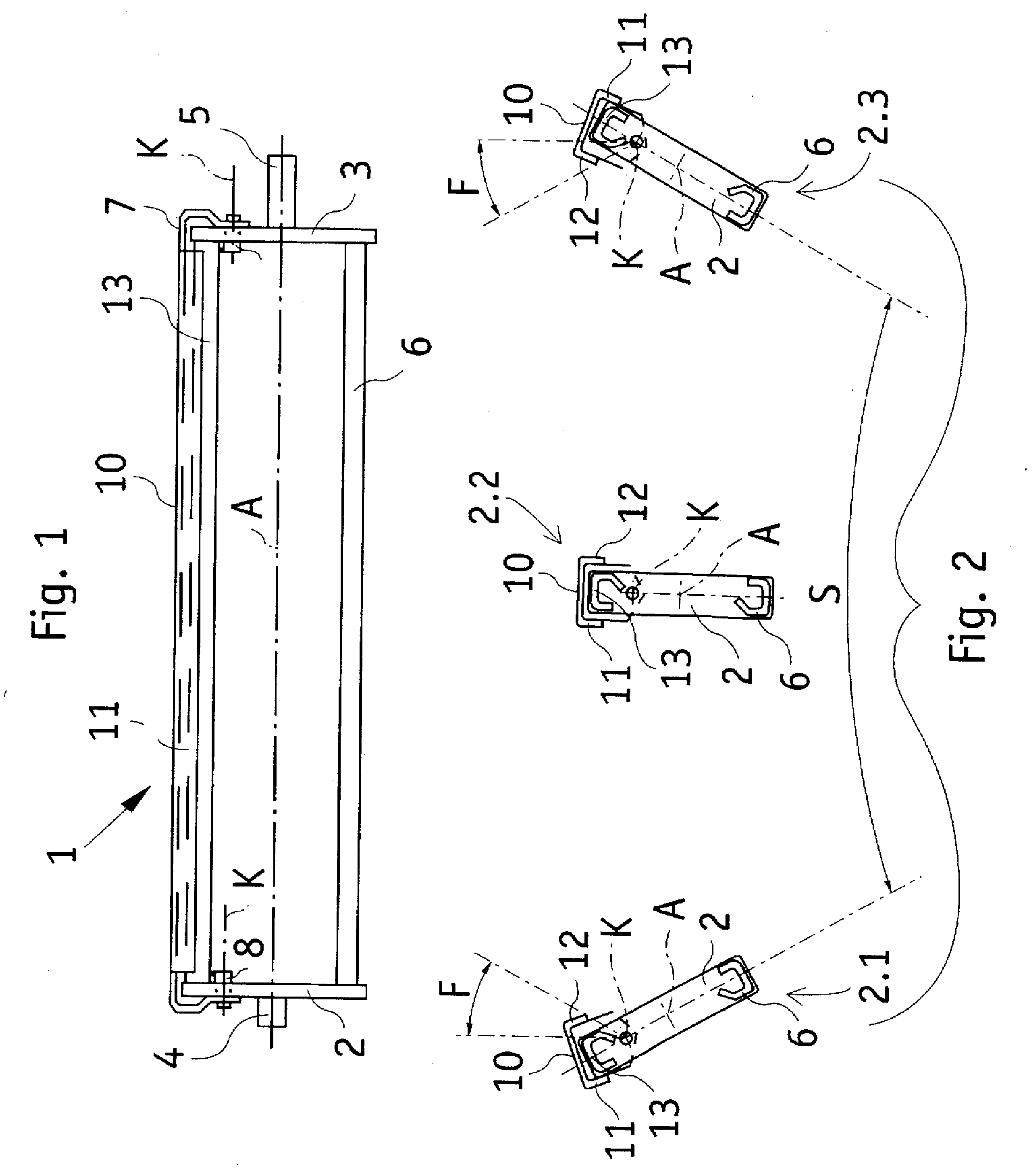
FIG. 1 is a longitudinal sectional view of the rocker according to the invention.
FIGS. 2 shows sectional views of different functional positions of the rocker.

A rocker 1 has two support legs 2, 3 with central bearing journals 4, 5. One bearing journal 5 is connected to a drive, not specifically shown, by means of which the rocker can be pivoted around the pivot axis A each time a product is being dispensed by the pivot angle S (cf. positions 2.1 and 2.3). At the time of one product dispensing, the rocker is pivoted in one direction by the pivot angle S. At the time of the next product dispensing, it is pivoted in the other direction by the pivot angle S. Position 2.2 shows an intermediate position.

A lower product support part 6, which is rigidly connected to the support legs 2, 3, extends under the pivot axis A between the support legs 2, 3. An attachment 7, which is mounted tiltably tilt axis K around pins 8, 9 on the support legs 2, 3 above the pivot axis A, extends above the pivot axis A between the support legs 2, 3. The tilt axis K may also coincide with the pivot axis A or be located under it.

The attachment 7 forms a support surface 10 for the bottles. Its longitudinal edges 11, 12 are bent off downward (toward the tilt axis K). A strip 13, which is fastened to the support legs 2, 3, extends between these longitudinal edges 11, 12. As a result, a stop means is created, which limits the free-running angle F of the tilting of the attachment 7 around the tilt axis K, on the one hand, and permits the attachment 7 to pivot together with the rocker 1, on the other hand.

The rocker 1 is located centrally at the bottom of a product shaft 14 cf. FIG. 3, whose shaft walls 15, 16 have baffles 17, 18, which press the bottle located closest to the attachment 7 in the direction of the center of the shaft, so that the zigzag position shown in FIG. 3 is formed. The bottles do not have to stand in a zigzag position above the baffles 17, 18. Especially extensively rectangular bottles with rounded square cross section are stacked next to each other above the baffles 17, 18 to save space.

The function of the product-dispensing device described is essentially as follows:

FIG. 3.1 shows one starting position resting position of the rocker 1. The lowermost bottle a dropped out before. The next bottle b is being supported by the lower product support part 6. The next bottle c is being flatly supported in the middle of the support surface 10 of the attachment 7, so that it may also be readily pressed in there under the weight of the stack of bottles located above it, which happens especially in the case of bottles made of soft PET. The attachment 7 is already at a short distance before (or forward in the next direction of movement of rocker 1) the rocker 1 in this position as a consequence of the free-running angle F, and the lower product support part 6 has thus arrived in the starting position according to FIG. 3.1. The lower product support part 6 is moved away in this starting position to the extent that the bottle a is able to drop out with certainty even in the case of tolerances in diameter or angular cross section.

Starting from the position according to FIG. 3.1, the rocker 1 pivots in the direction indicated by the arrow s1. The position of the attachment 7 remains unchanged within the free-running angle F. If the position according to FIG. 3.2 is then reached, the strip 13 comes into contact with the longitudinal edge 12 of the attachment 7, so that the latter will then also be pivoted together. The bottle b begins to move downward as a consequence of the lower product support part 6 being pivoted away.

In FIG. 3.3, the attachment 7 has been pivoted together by a certain amount in the direction s1. No sharp edge of the attachment 7 comes into contact with the bottle c during this movement. The attachment 7 slides through under the bottle c.

The bottle b has dropped out in the position according to FIG. 3.4. The bottle c has dropped to the lower product support part 6 on the left-hand side of the lower product support part 6. The bottle d now moving on behind it finds a flat support on the support surface 10 of the product support part 6. The attachment 7 remains in this position due to the weight of the bottle d and of the stack of bottles weighing on it. The attachment 7 or another part of the rocker 1 is now prevented from digging into the - soft - bottle d. The lower product support part 6 is still moving in the direction s1 within the free-running angle F until the other starting position (resting position) (cf. FIG. 3.5) is reached. It is guaranteed as a result that the bottle b will drop out with certainty even if it should not have dropped out in the passage position according to FIG. 3.4.

The position according to FIG. 3.5 corresponds to the position according to FIG. 3.1.

The next time a product is dispensed, the rocker 1 is pivoted from the position according to FIG. 3.5 in the direction of the arrow s2. The processes described are now repeated analogously. The position according to FIG. 3.6 now corresponds to the position according to FIG. 3.3.

The bottle being supported on the lower product support part 6 is held between this and the shaft wall 15 or 16 until the lower product support part 6 is pivoted away by a corresponding amount.

While a specific embodiment of the invention has been shown and described in detail to illustrate the application of the principles of the invention, it will be understood that the invention may be embodied otherwise without departing from such principles.

What is claimed is:

1. A product-dispensing device of a vending machine for bottles or cans, comprising:

a product shaft;

a rocker arranged at the bottom of said product shaft, said rocker being mounted for alternatingly pivoting about a pivot axis into a right and left starting position for dispensing products, said rocker having an upper end and a lower end with a lower product support part, said upper end and lower end being pivoted to the right and left in opposite directions when the rocker is driven, pivoting around said pivot axis;

an upper product support part including an attachment mounted tiltably on said rocker and an upper support surface; and a stop means, for preventing said attachment from tilting beyond stop points such that said attachment pivots with said rocker, said stop means being provided between said rocker and said attachment, wherein said stops define a free-running angle of movement between said attachment and said rocker for maintaining said upper support surface within said free running angle for support of products within said product shaft, above said rocker.

2. A product-dispensing device in accordance with claim 1, wherein said attachment pivots with said rocker from a starting position after passing through the free-running angle.

3. A product-dispensing device in accordance with claim 1, wherein said attachment stops under the load of a stack of products before the rocker reaches one of said starting positions.

4. A product-dispensing device in accordance with claim 1, wherein said attachment is mounted on said rocker above said pivot axis of said rocker.

5. A product-dispensing device in accordance with claim 1, wherein said stop means includes longitudinal edges of said attachment which are bent over, and a part rigidly attached to said rocker, said part engaging between said longitudinal edges of said attachment.

6. A product-dispensing device in accordance with claim 1, wherein above said attachment, said product shaft has baffles, which narrow a product space in said product shaft.

7. A product-dispensing device in accordance with claim 1, wherein said upper support surface is substantially flat.

8. A product-dispensing device in accordance with claim 1, wherein said upper support surface is maintained directed substantially upwardly.

9. A product-dispensing device of a vending machine for products, comprising:

a product shaft defining a product feed direction;

a rocker arranged at the bottom of said product shaft, said rocker being mounted for alternatingly pivoting about a pivot axis into a right and left starting position for dispensing products, said rocker having an upper end and a lower end, said lower end having a lower product support part, said upper end and lower end being pivoted to the right and left in opposite directions when the rocker is driven, pivoting around said pivot axis;

an upper product support part including an attachment mounted tiltably on said rocker for movement between stop points such that said attachment pivots with said rocker to define a free-running angle of movement between said attachment and said roger, said upper product support part including an upper support surface for support of products within said product shaft, said free-running angle of movement being such as to maintain said upper support surface facing substantially upwardly in each of said right and left starting positions and between said right and left starting positions.

10. A product-dispensing device in accordance with claim 9, wherein said attachment pivots with said rocker from a starting position after passing through the free-running angle.

11. A product-dispensing device in accordance with claim 9, wherein said attachment stops under the load of a stack of products before the rocker reaches one of said starting positions.

12. A product-dispensing device in accordance with claim 9, wherein said attachment is mounted on said rocker above said pivot axis of said rocker.

13. A product-dispensing device in accordance with claim 9, wherein said attachment is mounted with stop means including longitudinal edges of said attachment which are bent over, and a part rigidly attached to said rocker, said part engaging between said longitudinal edges of said attachment.

14. A product-dispensing device in accordance with claim 9, wherein above said attachment, said product shaft has baffles, which narrow a product space in said product shaft.

15. A product-dispensing device of a vending machine for products, comprising:

a product shaft defining a product feed direction;

a rocker arranged at the bottom of said product shaft, said rocker being mounted for alternatingly pivoting about a pivot axis into a right and left starting position for dispensing products, said rocker having an upper end and a lower end, said lower end having a lower product support part, said upper end and lower end being pivoted to the right and left in opposite directions when the rocker is driven, pivoting around said pivot axis;

an upper product support part including an attachment mounted tiltably on said rocker for movement between stop points such that said attachment pivots with said rocker and tilts relative to said rocker to define a free-running angle of movement between said attachment and said rocker, said upper product support part including an upper substantially flat support surface for support of products within said product shaft above said rocker, said free-running angle of movement being such as to maintain said upper support surface facing substantially upwardly in each of said right and left starting positions and between said right and left starting positions.

16. A product-dispensing device in accordance with claim 15, wherein said attachment pivots with said rocker from a starting position after passing through the free-running angle.

17. A product-dispensing device in accordance with claim 15, wherein said attachment stops under the load of a stack of products before the rocker reaches one of said starting positions.

18. A product-dispensing device in accordance with claim 15, wherein said attachment is mounted on said rocker above said pivot axis of said rocker.

19. A product-dispensing device in accordance with claim 15, wherein said attachment is mounted with stop means including longitudinal edges of said attachment which are bent over, and a part rigidly attached to said rocker, said part engaging between said longitudinal edges of said attachment.

20. A product-dispensing device in accordance with claim 15, wherein above said attachment, said product shaft has baffles, which narrow a product space in said product shaft.

* * * * *